US008478185B2

(12) United States Patent
Capone et al.

(10) Patent No.: US 8,478,185 B2
(45) Date of Patent: Jul. 2, 2013

(54) SYSTEMS AND METHODS FOR IMPROVING MEDIA FILE ACCESS OVER AN EDUCATIONAL TESTING NETWORK

(76) Inventors: Richard William Capone, Kensington, CA (US); Allan William Heaton, Bend, OR (US)

( * ) Notice: Subject to any disclaimer, the term of this patent is extended or adjusted under 35 U.S.C. 154(b) by 2 days.

(21) Appl. No.: 13/297,267

(22) Filed: Nov. 16, 2011

(65) Prior Publication Data

US 2012/0295243 A1    Nov. 22, 2012

Related U.S. Application Data

(63) Continuation of application No. 11/936,068, filed on Nov. 6, 2007, now abandoned.

(51) Int. Cl.
*G06F 15/16* (2006.01)
*G09B 3/00* (2006.01)

(52) U.S. Cl.
USPC ............................ 434/350; 709/219; 434/322

(58) Field of Classification Search
USPC ................... 434/322, 350, 362; 709/217, 219, 709/203, 228; 707/10, 104
See application file for complete search history.

(56) References Cited

U.S. PATENT DOCUMENTS

| D366,744 S | 1/1996 | Bailey |
| 5,893,717 A | 4/1999 | Kirsch et al. |
| 5,956,716 A * | 9/1999 | Kenner et al. ........................ 1/1 |
| 6,030,226 A | 2/2000 | Hersch |
| 6,144,838 A | 11/2000 | Shehan |
| 6,491,525 B1 | 12/2002 | Hersch |
| 6,665,721 B1 * | 12/2003 | Hind et al. .................... 709/227 |
| 6,675,037 B1 | 1/2004 | Tsekos |
| 6,832,069 B2 | 12/2004 | Stout |
| 2002/0165986 A1 * | 11/2002 | Tarnoff ......................... 709/246 |
| 2005/0233295 A1 | 10/2005 | Chiszar |

* cited by examiner

*Primary Examiner* — Kang Hu
(74) *Attorney, Agent, or Firm* — Tran & Associates (57) ABSTRACT

Systems and methods are disclosed for serving fresh media content while minimizing Internet traffic by periodically checking content freshness between a local server and a remote server; if a stale content exists on the local server, replacing the stale content with a fresh content from the remote server; and serving the fresh content from the local server.

17 Claims, 8 Drawing Sheets

SYSTEMS AND METHODS FOR IMPROVING MEDIA FILE ACCESS OVER AN EDUCATIONAL TESTING NETWORK

This application is a continuation of Ser. No. 11/936,068 filed Nov. 6, 2007 now abandoned, the content of which is incorporated by reference.

BACKGROUND

The present application relates to high speed file access for educational testing.

The advent of media rich digital content is changing the face of Internet applications. Various applications such as training and education require users to access media contents such as photographs, streaming audio and video, and training materials. Rich media streaming involves various types of media such as audio, video, text, and/or images.

Figure 1:
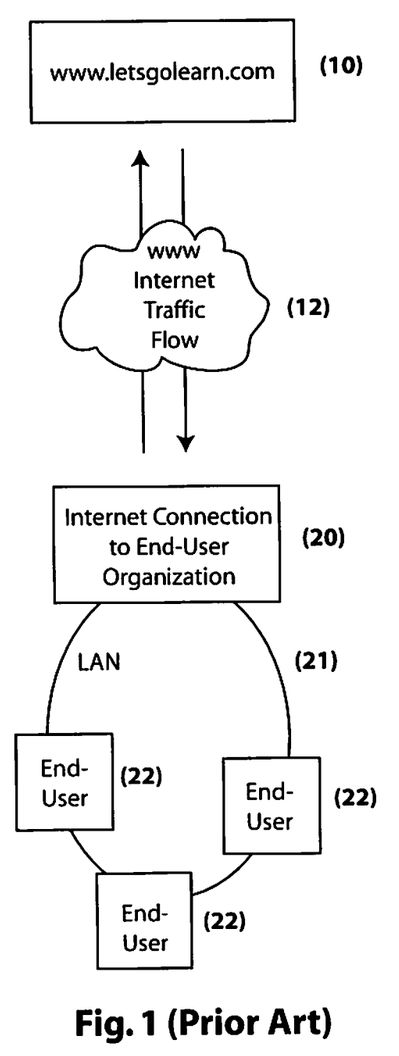
FIG. 1 shows a conventional web application to client communication process.

For example, FIG. 1 shows an exemplary web application to client communication process for educational applications from Let's Go Learn. Content is streamed from an originating server 10 such as a server from an educational system called Let's Go Learn (www.letsgolearn.com). The content is streamed over a wide area network such as the Internet 12 to an end-user Internet connection point 20. The connection point 20 is in turn connected to a local area network (LAN) 21 and a plurality of user workstations 22 are connected to the LAN 21 to receive training materials originating from the server 10.

Media streaming involves various network conditions with different bandwidths and delays. In streaming, a receiving device reproduces sound or video in real time as the signal is downloaded over the Internet, as opposed to storing the signal in a local file first. A plug-in to a Web browser, such as Netscape Navigator, decompresses and plays the data as it is transferred to a personal computer over the Internet. Streaming audio or video avoids the delay entailed in downloading an entire file and then reproducing it with a helper application. Streaming requires a fast connection and a computer with sufficient processing capability to execute the decompression algorithm in real-time.

Computer networks, such as the Internet, now carry data for multimedia applications, which are particularly latency-sensitive, or vulnerable to delay. For example, a delay experienced during the transmission of video data interrupts the video enjoyment experience. In contrast, a delay in downloading a Web page is less problematic to the user. Conversely, voice transmission requires less bandwidth (bits per second) than receiving a Web page, for example, but does require an uninterrupted amount of bandwidth.

U.S. Pat. No. 6,671,732 discloses a method and an apparatus for tagging rich media content so that receivers of electronic information on electronic networks can specify content preferences. The transmission of content is controlled by the setting of priorities by the user, according to different forms of content, and then the system deletes content beginning with that of lowest priority. Content can be deleted because of poor communication conditions, or proactively to effectively highlight aspects of the communicated information in conformance to the desires of the user.

SUMMARY

Systems and methods are disclosed for serving fresh media content while minimizing Internet traffic by periodically checking content freshness between a local server and a remote server. If stale content exists on the local server, the local server replaces stale content with fresh content from the remote server and serves the fresh content from the local server.

Advantages of the system may include one or more of the following. The system efficiently serves media files from a remote local network in place of downloading large media files over the Internet. By doing so, the system greatly reduces the Internet bandwidth requirement of the customer while still providing a content rich experience involving large multi-media files. The system works with existing network infrastructure. The system allows customers such as schools that have limited Internet bandwidth and/or heavily congested Internet usage during assessment times to operate more effectively. The system selectively serves static rich media files, which are usually large in file size, locally and will only send the assessment testing data or instructional-status data over the Internet connection. The net result will be that the Internet bandwidth usage will be greatly reduced. The assessment testing data or instructional-status data in turn provides educators, parents and employers with an immediate feedback, an ability to create and edit these tools at any time, anywhere, an ability to score and store the data in a remote location and to upload to a computer at a later time, and an ability to aggregate the data from multiple scorers.

Other advantages may include one or more of the following. The reading assessment and reading instruction systems allows the teacher to expand his or her reach to struggling readers and acts as a reading specialist when too few or none are available. The math assessment and math instructional systems allows the teacher to quickly diagnose the student's number and measurement skills and shows a detailed list of skills mastered by each math construct. Diagnostic data is provided to share with parents for home tutoring or with tutors or teachers for individualized instructions. Diagnostic data is used to provide direct online instruction that is differentiated for each student. All assessment reports are available at any time. Historical data is stored to track progress, and reports can be shared with tutors, teachers, or specialists. For parents, the reports can be used to tutor or teach your child yourself. The web-based system can be accessed at home or when away from home, with no complex software to install.

Other advantages and features will become apparent from the following description, including the drawings and claims.

BRIEF DESCRIPTION OF THE DRAWINGS

Referring now to the drawings in greater detail, there is illustrated therein structure diagrams for an educational adaptive assessment and instruction system and logic flow diagrams for the processes a computer system will utilize to complete various educational or training transactions. It will be understood that the program is run on a computer that is capable of communication with consumers via a network, as will be more readily understood from a study of the diagrams.

DESCRIPTION

Figure 2:
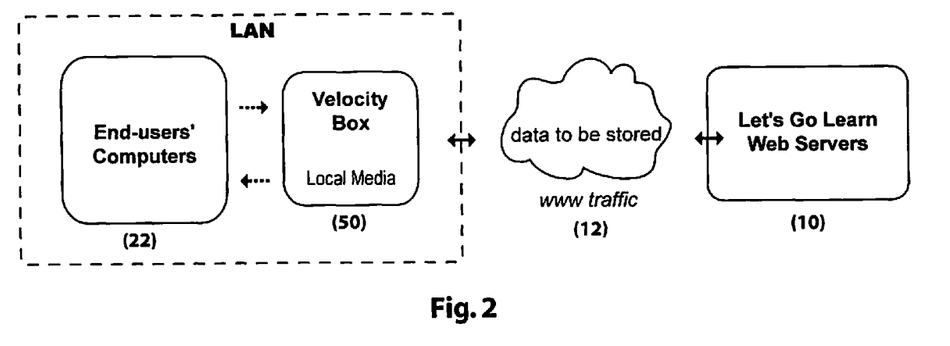
FIG. 2 shows an exemplary system that accelerates rich media transmission.

FIG. 2 shows an exemplary system that accelerates rich media transmission. In this system, a source or originating server 10 communicates data over the Internet 12 as is done in FIG. 1. However, a local media device 50 is inserted between the internet 12 and the end user workstations or computers 22.

Figure 3:
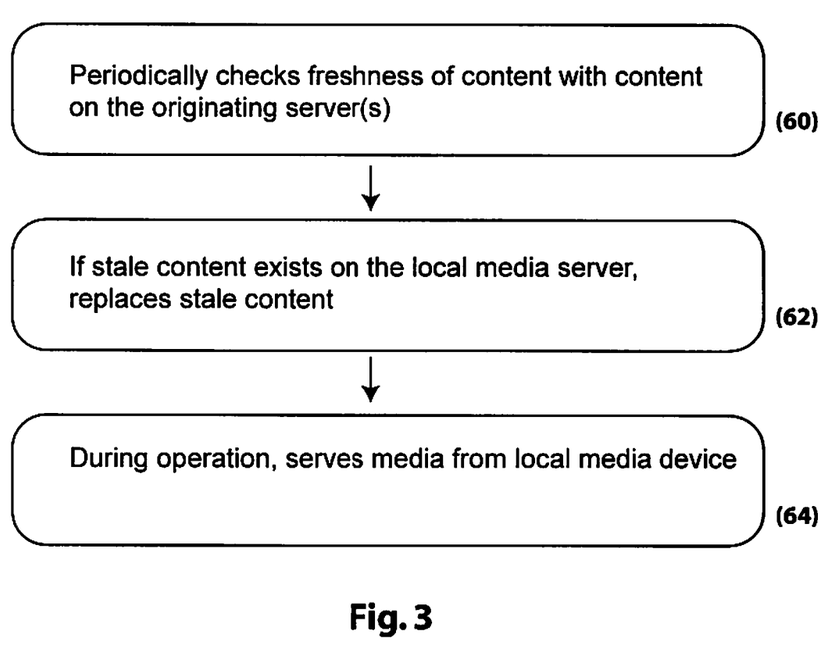
FIG. 3 shows an exemplary operating process for the local media device.

FIG. 3 shows an exemplary operating process for the local media device 50. The device 50 is initially provided with fresh media content and the device 50 serves content upon request from the end user workstations or computers 22. Over time, content on the originating server 10 is updated or otherwise enhanced, and a variance exists between the content on the local media device 50 and the originating server 10. To synchronize the content on the local media device 50 and the originating server 10, the local media device 50 periodically checks to see if its media content matches the time stamp or size (among others) of corresponding files on the originating server 10 (60). If differences exist, the local media device 50 replaces its stale content by copying the content of the originating server 10 to replace older content (62). The update operation can be done at night to minimize performance disruptions on the users. Once updated, media content is served by the local media device 50 in response to requests from end-user computers 22. Such local delivery of data reduces data transfer over the Internet 12. The reduced bandwidth requirement allows the originating server 10 to serve more LANs which in turn can service more clients.

Figure 4:
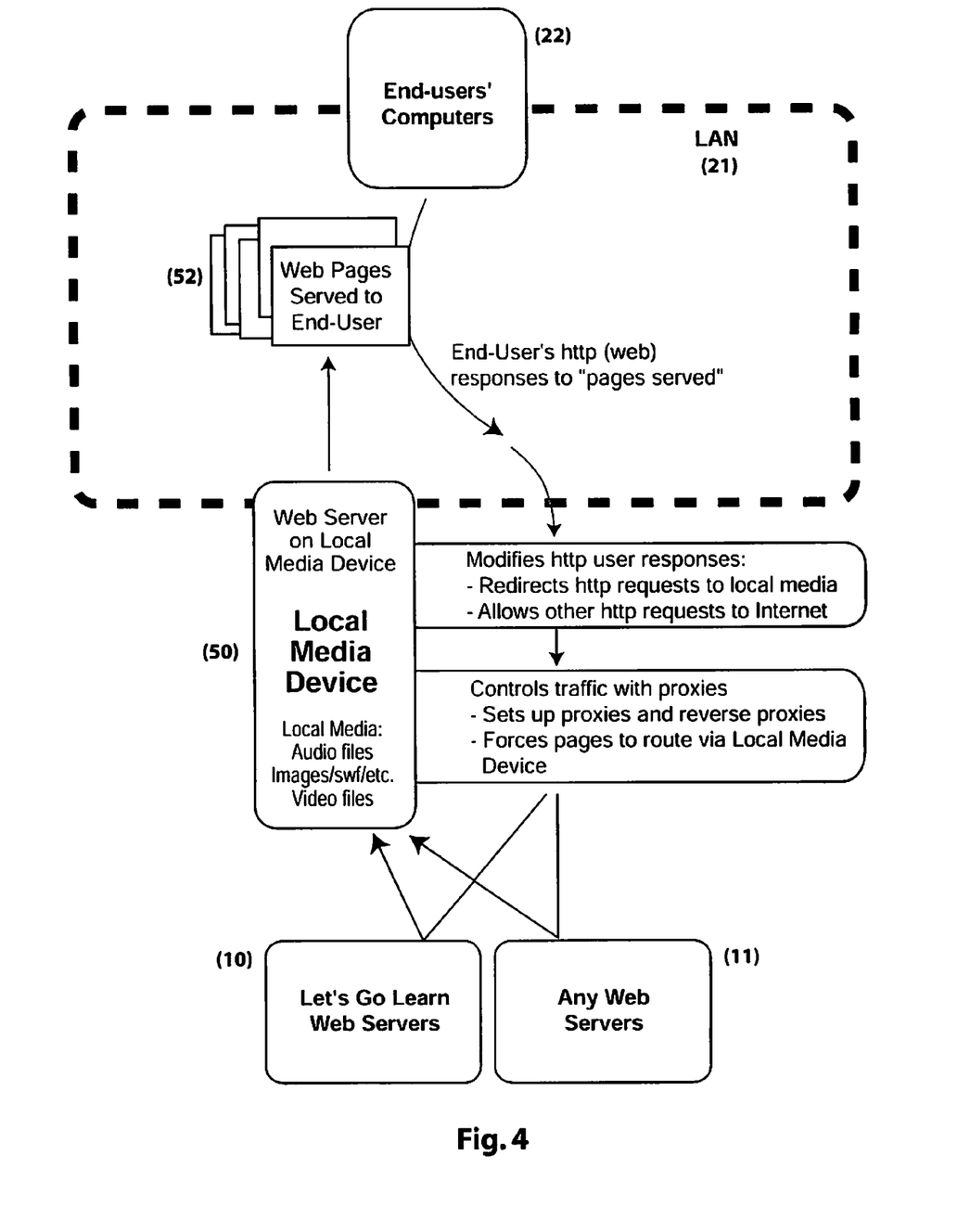
FIG. 4 shows an exemplary rich media servicing process in accordance with one aspect of the system.

FIG. 4 shows an exemplary rich media servicing process in accordance with one aspect of the system. As discussed above, content from the originating server 10 or any other web servers 11 is sent to the local media device 50. The content can be audio files, images, flash content, or video files, for example. The device 50 includes a web server that serves web pages 52 to end-users at their computers 22. The end-user's web response (such as an http response) is sent back to the local media device 50. The device 50 modifies the user's web response to redirect rich media requests to the local media device 50 while allowing requests not directed at the rich media content to be forwarded to the Internet for other servers to respond to. Traffic is controlled through proxies. The device 50 sets up a proxy server and reverse proxy server and forces pages to route through the device 50. A proxy server is a server (a computer system or an application program) which services the requests of its clients by forwarding requests to other servers. A client connects to the proxy server, requesting some rich media service, such as a music file or video file, connection, web page, or other resource, available from a different server. The proxy server provides the resource by connecting to the specified server and requesting the service on behalf of the client. A proxy server may optionally alter the client's request or the server's response, and sometimes it may serve the request without contacting the specified server. A proxy server that passes all requests and replies unmodified is usually called a gateway or sometimes tunneling proxy. The proxy server can be placed in the user's local computer or at specific key points between the user and the destination servers or the Internet. A reverse proxy is called because it acts as a proxy for in-bound traffic to many servers hidden behind a single IP address (eg. a cluster of web servers all serving content for the same domain).

Figure 5:
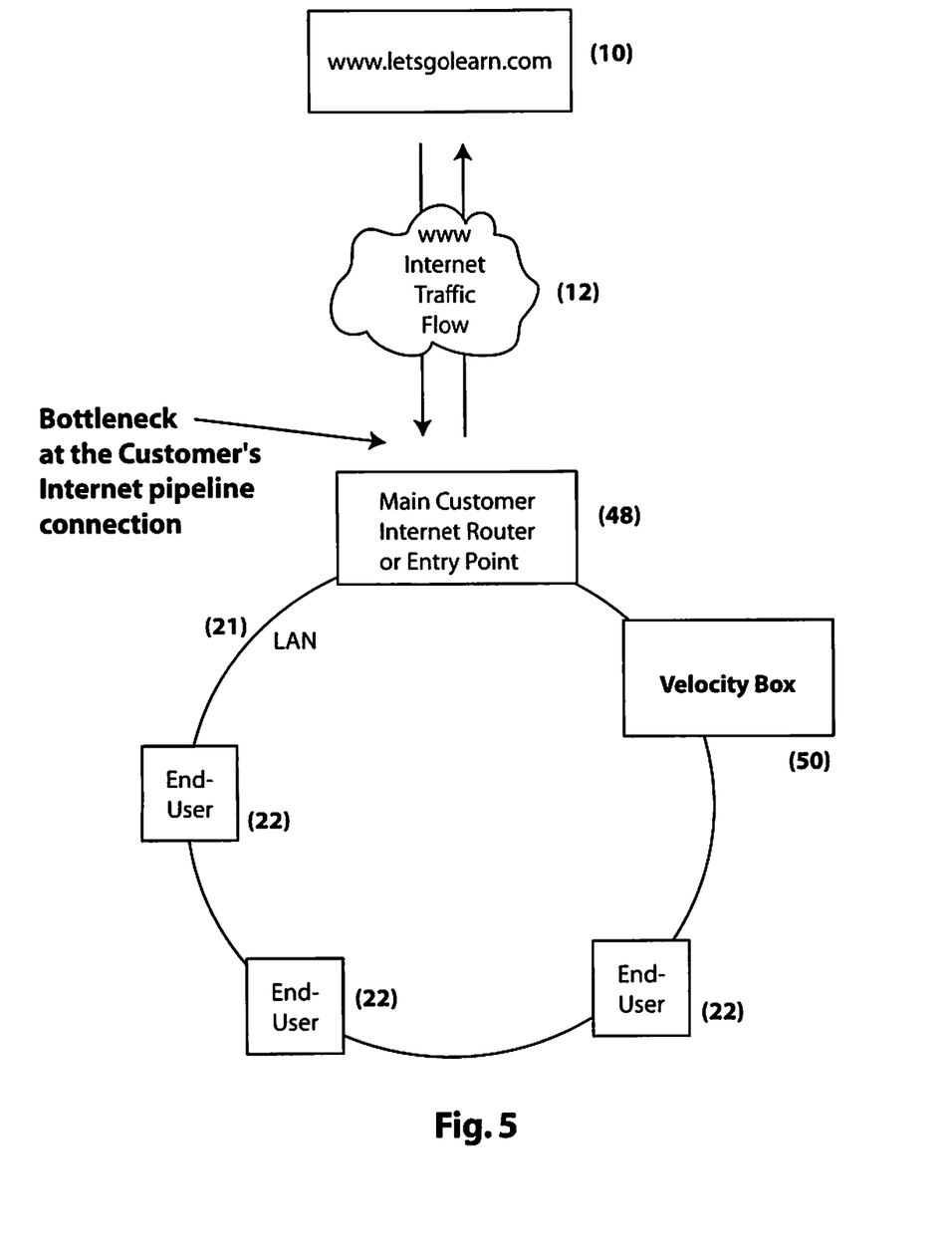
FIG. 5 shows an exemplary use case where the device 50 is on a top level customer LAN.

FIG. 5 shows an exemplary use case where the device 50 is on a top level customer LAN. In this system, the source or originating server 10 communicates data over the Internet 12. The data is received at a main customer Internet router or entry point 48 and provided to a LAN 21. The local media device 50 as well as a plurality of end user workstations or computers 22 are connected to the LAN. The device 50 acts as a local cache that serves rich media requests from its own data storage devices if the requests are directed at contents on the originating server 10. Otherwise, the local media device 50 forwards the request through the router or entry point 48 to its intended server. In this manner, the device 50 solves the bottleneck at the customer's Internet pipeline connection. The bottleneck is defined as the point in the end-user to web communication where the Internet communication is the most congested.

Figure 6:
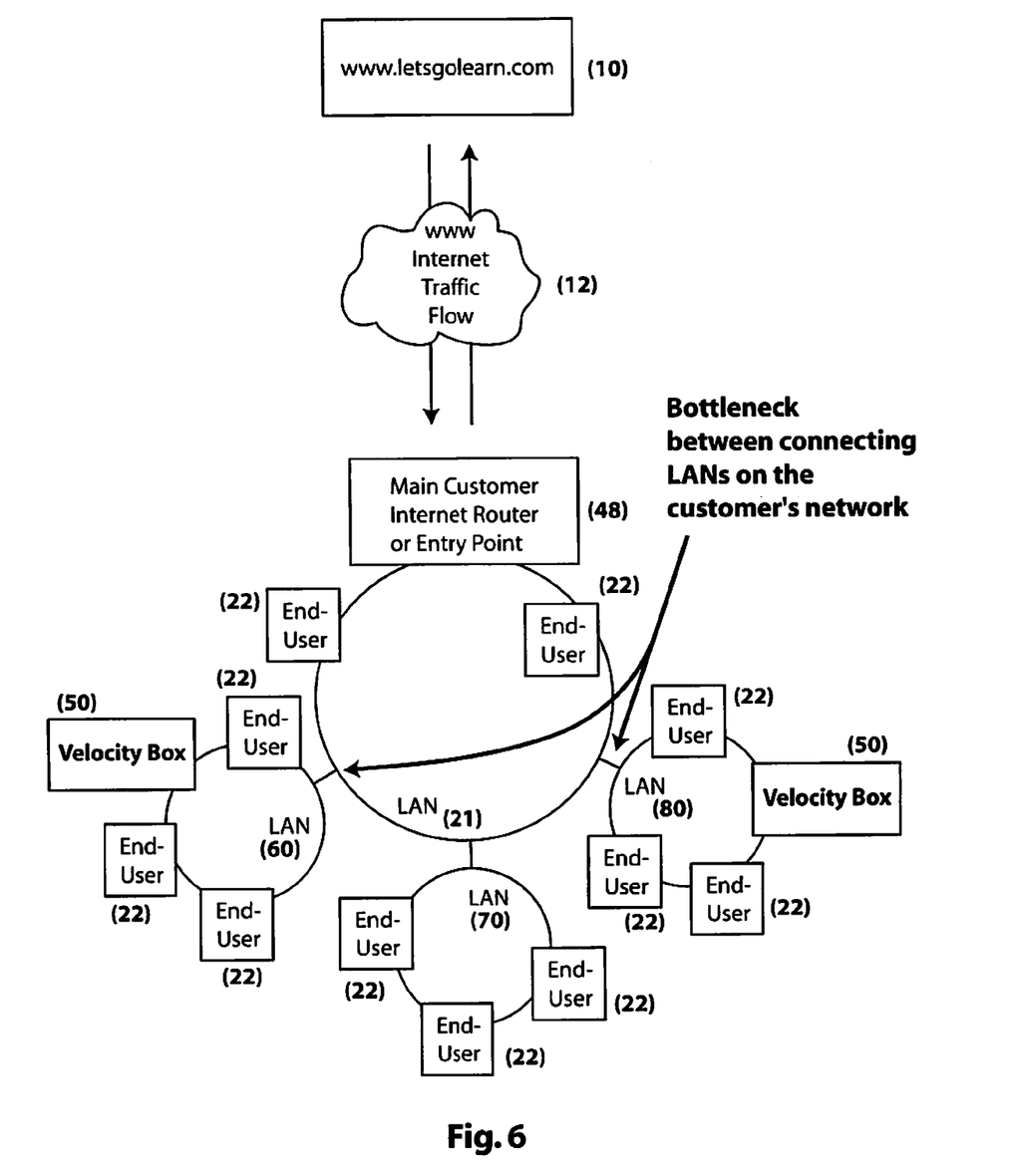
FIG. 6 shows another exemplary use case where multiple devices 50 are deployed on one or more low level customer LANs.

FIG. 6 shows another exemplary use case where multiple devices 50 are deployed on one or more low level customer LANs. In this embodiment, LAN 21 communicates with a plurality of lower level LANs 60, 70 and 80. In certain high load LANs such as LANs 60 and 80, the devices 50 are provided in each LAN to relieve the bottleneck therein. In certain other LANs such as LAN 70 where the load is not intensive, the LAN may not need the device 50. Hence, FIG. 6 shows a heterogeneous set of LANs which may or may not need dedicated local media devices 50.

During operation, a student logs on-line and based on the parameters, is presented with a presentation (instructions, lessons, etc.) and one or more follow-up questions selected from a set of questions. The presentation can be a multimedia presentation including sound, image, animation, video and text. The multimedia presentation or content is typically stored in the local server 50. However, the content may be periodically updated, and thus the local server 50 needs to periodically refresh its content by comparing and downloading revised content on the remote server 10.

The student is either tested for comprehension of the concept and the diagnostic engine presents additional questions in this concept based on the student's performance on earlier questions OR the student is given a lesson and based on his/her performance/completion is given follow up lessons. The process is repeated for additional concepts based on the test-taker's performance on earlier concepts. When it is determined that additional concepts do not need to be covered for a particular test-taker, the test halts. Prescriptive recommendations and diagnostic test results are compiled in real-time when requested by parents or teachers by data mining the raw data and summary scores of any student's particular assessment.

Figure 7A:
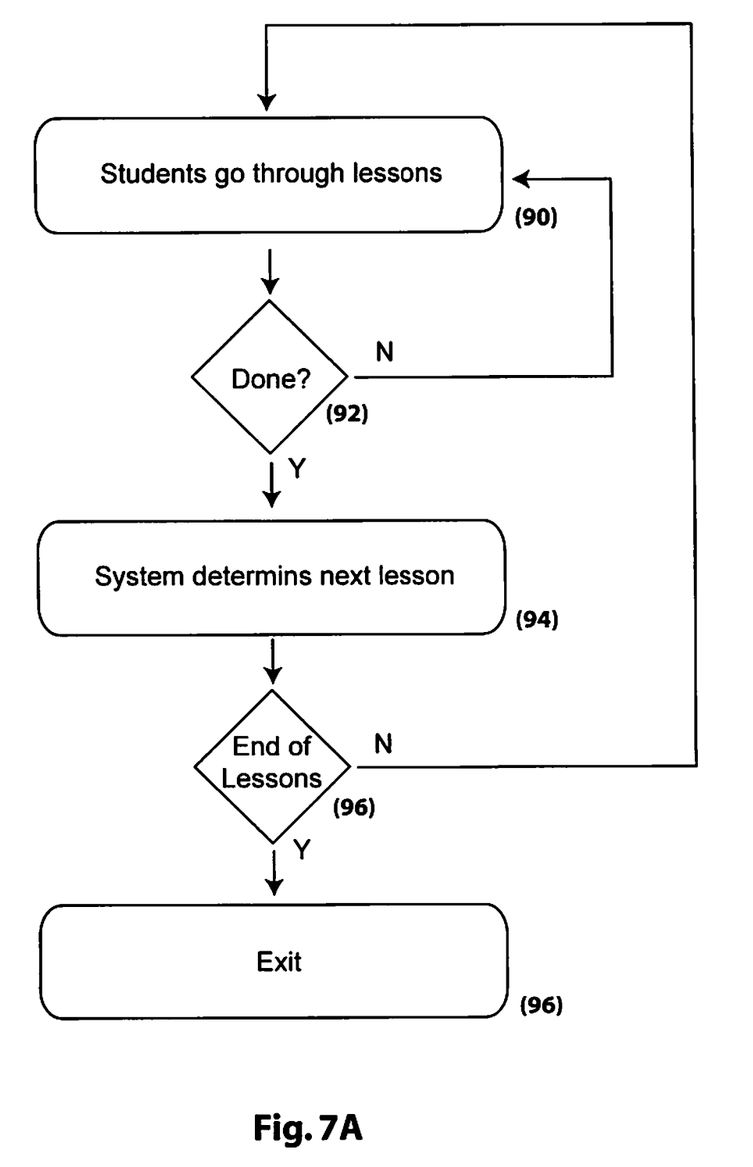
FIG. 7A shows an exemplary instruction process.

FIG. 7A shows an exemplary instructional process. The system paces the students through the current lesson (90). This is repeated until the student is done with the current lesson (92). If the student is done, the system determines the next lesson to be provided to the student (94). If there is another lesson to be done, the system presents the next lesson to the student by looping back to 90, and if the student has reached the end of lessons (96), the system exits.

In this manner, the students start with the first lesson. When they are done with the first lesson, the system checks if the student is done with the current test so that the system can determine the next lesson. The students go through the new lesson, and the process repeats until all lessons have been completed. The continue touching of the system at the completion of each lesson is necessary so the system knows how the students are doing and redirect the student in case the teacher changed the student's lesson plan or the student's performance warrants a change.

Figure 7B:
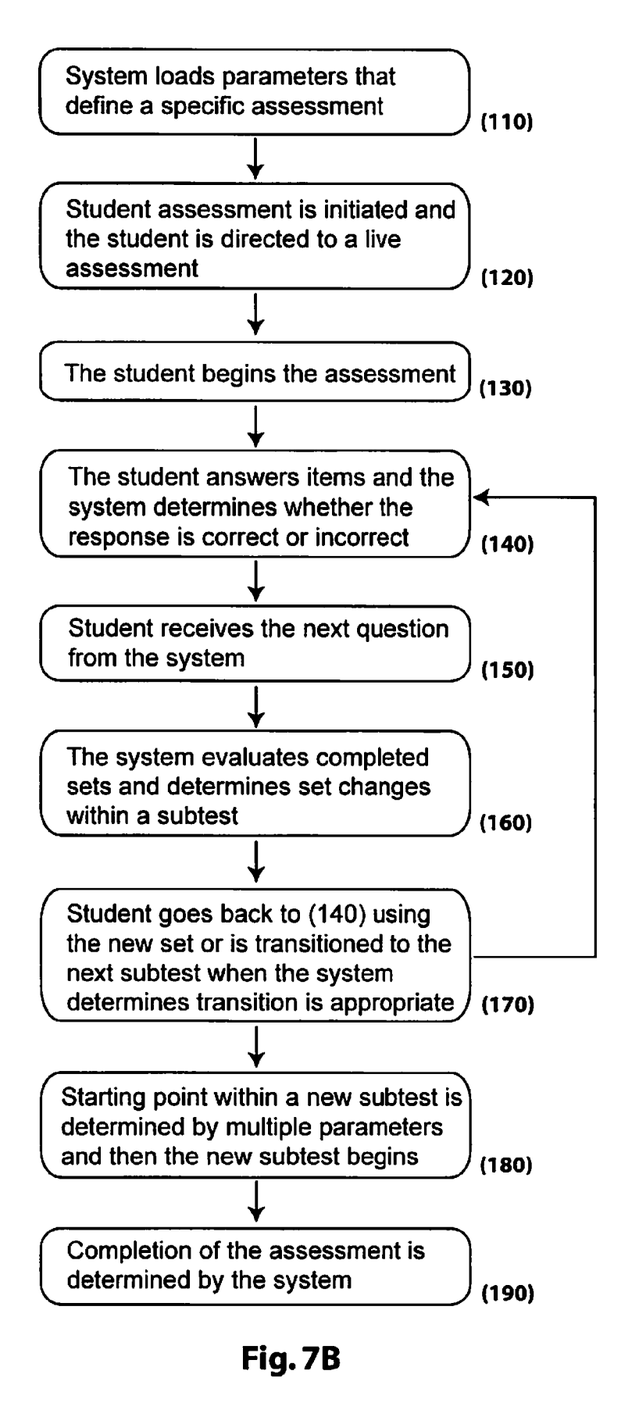
FIG. 7B shows an exemplary media rich process operative in an adaptive diagnostic assessment engine.

FIG. 7B shows an exemplary media rich process operative in an adaptive diagnostic assessment engine. In this process, the engine receives parameters that define a specific assessment (110). Among others, the parameters can include one or more of the following:

1) number of subtests in an assessment
2) number of sets per subtest
3) number of questions per set (can be variable between sets)
4) student parameters to use to determine assessment starting point
   a. i.e. grade level of student, age of student
   b. i.e. previous summary scores of student
5) transition between subtest parameters which determines how student will transition from one subtest to the next and whether subtests may be skipped or included.
6) Movement within a subtest which examines how students are moved within a subtest based on their performance on any particular set or multiple sets.
7) Termination conditions for each subtest and for the entire assessment
8) Graphical interface parameters such as trigger conditions for loading particular learning modules on the student's computer to deliver the questions and answers.
9) Audio parameters which determine audio file versions to be presented to a particular test-taker. For example, younger test-takers hear simple instructions and more motivational words while older test-takers hear more straight forward instructions that may use language at a higher grade level.
10) Summary score formula from each subtest if it is being scored.

Once parameters have been loaded, a student assessment test is initiated and the student is directed to a live assessment (120). The student enters the system through three pathways: For example, the student can log-in using a valid student log-in and password directly into the system. A teacher who is already logged into a teacher management application can allow the student to begins or continue a student assessment. Third-party companies who are suitably authorized can initiate an external account handshake which delivers a student directly into the system. This one way communication sends student information and a security key code. In real-time validation occurs and the assessment is begun.

The assessment process is initiated and a presentation and/or a question is presented to the student (130). The assessment can be based on his/her grade level, age, student type, or previous test scores from a completed assessment of the same type. The student responds with answers to questions or items and the system determines whether the student's response is correct or incorrect (140).

Any of the following conditions or all may be used to determine whether a response is correct or incorrect: 1) the system can compare the multiple choice question's answer to the student's multiple choice selection; 2) the system can compare a typed student response and compare the typed response to a question's correct answer for exact and/or partial match conditions; and 3) the system can examine student response time and compare the response time to a time limit conditions.

The student receives the next question from the system (150) and the system evaluates completed sets and determines set changes within a subtest (160). Sets can be made up of one or more questions. For example, the sets can be based on a percentage of correct responses in a set can move students to high or lower sets at variable jump sizes. The set can also be selected based on results from other completed or partially completed subtests can affect set changes in this current subtest. Alternatively, ceiling conditions determined by student's age, grade, type can affect set changes.

The student goes back to step four in the new set or is transitioned to next subtest when the system determines transitions appropriate (170). The following conditions may be used to determine when a transition should occur:

1) Mastery of a set is determined by specific assessment subtest parameters.
2) Adjacent set results of a mastered set above a non-mastered set can trigger termination of a subtest
3) Pattern of mastery and/or non-mastery of adjacent sets can determine termination of a subtest.
4) Completion of highest level set within a subtest can determine termination of a subtest.
5) Total number of errors in a set may trigger termination of a subtest.
6) Pattern of errors of a subtest may trigger termination of a subtest.

A starting point within a new subtest is determined by multiple parameters and then the new subtest begins (180). In one embodiment, the following are parameters may be used: 1) summary scores of a completed/terminated earlier subtest in the same assessment; 2) summary score of the same subtest in an earlier administered completed assessment; or calculations on multiple summary scores on multiple subtests that have just been completed in the same assessment.

The system determines whether the assessment is completed (190). Various conditions can affect the completion of the assessment. For example, if all subtests have been completed, skipped, or terminated the assessment is finished. Alternatively, if all subtests that have been marked by the test administrator or teacher have been completed then the assessment is finished. This is for the cases where test administrators may target only certain subtests to be given in an assessment that contains multiple subtests.

Optionally, the students who completed the assessment may be sent to a reward page that rewards him/her with entertaining graphics for completing the assessment. The rewards page is selected based on the student's age, grade, type, and assessment type. The student can also transferred to one of the following: a log out page; an instructional program related to the assessment and uses the data for differentiation; a third party student management system from where the student originated; or a summary page that provides the student with prescriptive or summary information on his or her assessment results.

One embodiment of FIG. 7 is an Online Adaptive Assessment System for Individual Students (OAASIS). The OAASIS assessment engine resides on a single or multiple application server accessible via the web or network. It controls the logic of how students are assessed. It is independent of the subject being tested. Assessments are defined to OAASIS via a series of parameters that control how adaptive decisions are made while student are taking an assessment in real-time. Furthermore, OAASIS references multiple database tables that hold the actual test times. OAASIS will pull from various tables as it reacts to answers from the test-taker. During use OAASIS can work across multiple computer processors on multiple servers. Students can perform an assessment and in real-time OAASIS will distribute its load to any available CPU.

The above embodiment of the adaptive diagnostic engine is an expert system that adaptively determines the set of questions to be presented to the student based on his or her prior performance. The expert system is based on rules that are communicated as parameters to the engine prior to running the assessment. Instead of the expert system, other data mining systems can be used. For example, in one embodiment, manual classification techniques can be used. Manual classification requires individuals to assign each output to one or more categories. These individuals are usually domain experts who are thoroughly versed in the category structure or taxonomy being used. In other embodiments, an automated classifier can be used to mine data arising from the test results. The classifier is a k-Nearest-Neighbor (kNN) based prediction system. The prediction can also be done using Bayesian algorithm, support vector machines (SVM) or other supervised learning techniques. The supervised learning technique requires a human subject-expert to initiate the learning process by manually classifying or assigning a number of training data sets of image characteristics to each category. This classification system first analyzes the statistical occurrences of each desired output and then constructs a model or "classifier" for each category that is used to classify subsequent data automatically. The system refines its model, in a sense "learning" the categories as new images are processed. Alternatively, unsupervised learning systems can be used. Unsupervised Learning systems identify groups or clusters of related image characteristics as well as the relationships between these clusters. Commonly referred to as clustering, this approach eliminates the need for training sets because it does not require a preexisting taxonomy or category structure.

The above system can be implemented as one or more computer programs. Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

Portions of the system and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

The present invention has been described in terms of specific embodiments, which are illustrative of the invention and not to be construed as limiting. Other embodiments are within the scope of the following claims. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method to serve flesh media content for a plurality of student computers coupled to a local area network (LAN) with a router coupled to the Internet to access multimedia educational content originally stored on a remote server, the method comprising:

attaching a local server to the LAN to locally store educational multimedia content and periodically synchronizing contents of the local server with contents on the remote server; determining requests for Internet contents and directing the requests in real-time to directories on the local server by creating proxies and reverse proxies to force web pages to route to the local server;

presenting the multimedia educational content to the students and testing for student comprehension of the multimedia content and presenting additional multimedia educational content based on student performance on earlier questions, wherein the presenting further comprises:

modifying a student's web response to redirect rich media requests to the local server while allowing requests not directed at the rich media to another server or to the Internet;

periodically checking content freshness between the local server and a remote server; if a stale content exists on the local server, replacing the stale content with a fresh content from the remote server; and serving the fresh content from the local server.

2. The method of claim 1, comprising providing educational adaptive diagnostic assessment of student performance.

3. The method of claim 1, comprising adaptively testing a student by: receiving one or more parameters for an assessment and one or more sets of test questions for a sub-test;
  selecting a set of test questions from the sub-test;
  presenting the selected set of test questions to the student and collecting responses thereto;
  generating a score for the responses to a completed set;
  applying the score to select either the current set of questions or a new set of test questions; and
  using a final score for the sub-test to select a new set of questions in a subsequent sub-test.

4. The method of claim 3, wherein the parameters comprise one or more of: a number of subtests, a number of sets of questions for each subtest, a number of questions per set of questions, an assessment starting point; a grade level, a student age, a prior score, a parameter specifying a transition between subtests, a parameter specifying a movement within a subtest, a termination condition for each subtest, a termination condition for the assessment, a graphical interface parameter, an audio parameter, and a summary score formula.

5. The method of claim 1, wherein a student responds to test questions through a teacher management application.

6. The method of claim 1, wherein the student responds to test questions through a third party application having a security key code.

7. The method of claim 1, wherein the student begins the assessment based on one of: a grade level, an age, a student type, a previous test score from a completed assessment.

8. A system, comprising:
a remote server to store fresh content;
a wide area network coupled to the remote server;
and a local server coupled to the wide area network, the local server periodically replacing stale content with fresh content from the remote server and serving the fresh content in response to a request from one or more clients coupled to the local server, wherein proxies and reverse proxies route web pages to the local server by modifying a student's response, for presenting multimedia educational content to students and testing for student comprehension of the multimedia content and presenting additional multimedia educational content based on student performance on earlier questions, wherein predetermined rich media multimedia content requests are sent to the local server; and other requests are forwarded to another server or to the Internet.

9. The system of claim 8, comprising:
the client receiving one or more parameters for an assessment and one or more sets of test questions for a sub-test;
selecting a set of test questions from the sub-test;
presenting the selected set of test questions to the student and collecting responses thereto;
generating a score for the responses to a completed set;
applying the score to select either the current set of questions or a new set of test questions;
and using a final score for the sub-test to select a new set of questions in a subsequent sub-test.

10. The system of claim 9, wherein the parameters comprise one or more of: a number of subtests, a number of sets of questions for each subtest, a number of questions per set of questions, an assessment starting point, a grade level, a student age, a prior score, a parameter specifying a transition between subtests, a parameter specifying a movement within a subtest, a termination condition for each subtest, a termination condition for the assessment, a graphical interface parameter, an audio parameter and a summary score formula.

11. The system of claim 8, comprising controlling traffic using one or more proxies.

12. The system of claim 8, comprising providing one or more reverse proxies.

13. The system of claim 8, comprising forcing certain requests to route through the local server.

14. The system of claim 8, comprising communicating through a primary local area network (LAN) directly coupled to the Internet.

15. The system of claim 8, wherein the local server is coupled to the LAN.

16. The system of claim 8, comprising communicating through one or more sub-LANs coupled to the primary LAN.

17. The system of claim 8, wherein the local server is coupled to one of the sub-LANs.

* * * * *